United States Patent [19]
Gof

[11] 3,930,227
[45] Dec. 30, 1975

[54] PORTABLE MOTOR VEHICLE VISUAL WARNING INDICATOR

[76] Inventor: Sonia M. Gof, 89 Haledon Ave., Paterson, N.J. 07522

[22] Filed: Nov. 26, 1973

[21] Appl. No.: 418,811

[52] U.S. Cl.................... 340/81 R; 40/39; 116/43; 340/114 R; 340/133; 340/241
[51] Int. Cl.².......................................... B60Q 1/36
[58] Field of Search...,.. 340/81 R, 241, 240, 114 R, 340/98, 118, 119, 131, 133, 138, 136, 141, 137; 116/40, 41, 43, 47, 48; 40/28 B, 39, 40, 41, 44, 49, 130 C, 130 B, 131 R, 131 A, 145 R, 59; 73/189, 230; 46/53, 58

[56] References Cited
UNITED STATES PATENTS

| | | | |
|---|---|---|---|
| 2,646,644 | 7/1953 | Richmond................................ | 46/58 |
| 2,985,976 | 5/1961 | Parker ..................................... | 40/39 |
| 3,119,261 | 1/1964 | Bonanno................................. | 73/189 |
| 3,138,959 | 6/1964 | Elam....................................... | 73/401 |
| 3,440,748 | 4/1969 | Hackley............................. | 40/129 C |
| 3,465,584 | 9/1969 | Turner................................... | 73/189 |
| 3,799,647 | 3/1974 | Luft................................... | 40/130 C |

*Primary Examiner*—John W. Caldwell
*Assistant Examiner*—Donnie L. Crosland
*Attorney, Agent, or Firm*—James J. Cannon, Jr.; James J. Cannon

[57] ABSTRACT

A portable motor vehicle visual warning indicator is comprised of a base, one or more pair of wind driven cups or veins pivotally mounted on the base for rotation about the base, one or more mirrors pivotally mounted on the base driven by the cups, and daylight reflective means connected to and driven by the cups. Optionally, the indicator may further incorporate additional features such as a magnetic base to secure the device to a metalic portion of the motor vehicle, and a switch activated lamp wherein the switch is periodically actuated by means connected to the rotating cups.

5 Claims, 2 Drawing Figures

PORTABLE MOTOR VEHICLE VISUAL WARNING INDICATOR

BACKGROUND OF THE INVENTION

1. Field of the Invention

The invention resides in the field of warning indicators and more particularly in the field of wind driven visual indicators for motor vehicles.

2. Description of the Prior Art

Various devices are currently available for visually indicating a motor vehicle is in distress. These range from portable flashing lights to flares to cloths tied to door handles or radio antennas. The purpose of these indicators is not only to signal the need for help but to alert passing traffic to a potential hazzard in the road ahead. These devices other than simple distress flags usually require the activation of power sources which may be a disadvantage. For example, flares must be lighted and placed in the road and portable flashing lights must be switched on and put in position. Further a flare once lighted is difficult to extinguish for future use, and battery units suffer from deterioration, leads, or the like through the passage of time often rendering them inoperable when most needed.

In contrast to prior art devices the present invention does not depend on a self contained power source, is highly visible both day and night, is inexpensive to manufacture, is durable having few parts, and is easily stored and placed in operation when needed. These and other advantages of the invention will become more apparent from the summary, description and drawings which follow.

SUMMARY OF THE INVENTION

The invention may be summarized as a portable visual warning indicator for motor vehicles in distress which consists of a base, at least one pair of wind driven cups or veins pivotally mounted to rotate about the base, one or more mirrors pivotally mounted to rotate in conjunction with the wind driven cups and daylight reflective means connected to and driven by the cups.

The indicator is powered by the wind generated by passing traffic as well as any natural occurring wind which is blowing at the time. During an emergency the device is placed on top of the vehicle where it can be seen by on-coming traffic. As the cups rotate a highly visible daylight reflective surface rotates as well. This may comprise a coat of Day-Glo reflective paint on the cups themselves or on tabs attached to the cups. One or more mirrors are arranged to be rotatably driven by the cups as well to reflect back the light of approaching head lights. A flashing effect is created since the mirror or mirrors rotate in and out of the field of illumination of the headlights and the field of vision of the observers in the moving vehicles.

The invention requires no power in the ordinary sense, that is, no batteries or flares or the like. As a result, it has the great advantage of reliability over most other devices presently available for the same purpose. All that is necessary to use the indicator is to get it out of storage, the automobile trunk for example, and set it in place. This feature encourages use for even stops promoting the safety of the occupants of both the stopped and oncoming cars. These and other features of the invention are described and shown in more detail in the Description of the Preferred Embodiment and the Drawings below.

DESCRIPTION OF THE PREFERRED EMBODIMENT

Figure 1:
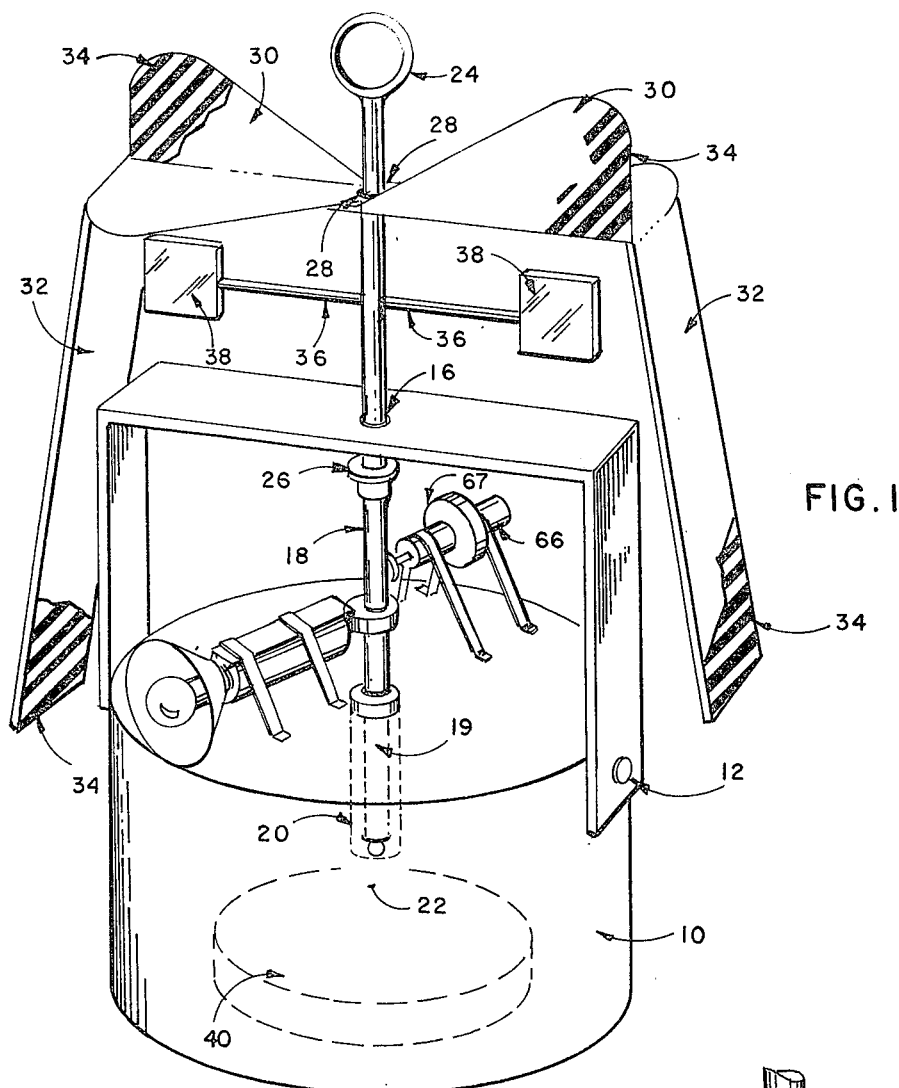
FIG. 1 is a perspective view of the preferred embodiment of the invention.

Referring first to FIG. 1, there is shown in perspective view a warning indicator which incorporates the features of the invention. Base 10 which may be constructed of any durable material, plastic or wood for example, has support bracket 12 attached thereto for the purpose of providing a sleeve bearing surface 16 for rotatable shaft 18. The bottom portion 19 of shaft 18 fits into cup 20 and rests on ball thrust bearing 22.

The upper end of shaft 18 terminates in ring 24 which provides a carrying handle for moving the indicator about. The shaft may be prevented from pulling away from the base by collar 26 which will contact bracket 12 when the indicator is lifted upward by the ring.

Arms 28 are attached to shaft 18 by any conventional means and have opposed wind catching cups or veins 30 fastened at each end. Optionally, a tab 32 may be fastened to the edge of each cup. The tabs are preferably oriented to offer the least wind resistance upon rotation, that is, with the plane of the tab more or less tangential to the circumference of rotation.

Means are provided to render the cups and tabs, when provided, highly visible in daylight. This may be accomplished by coating each with a highly reflective paint such as Day-Glo indicated in part by shaded areas 34.

Additionally, arms 36 are attached to rotatable shaft 18 for supporting mirrors 38. Each mirror may be reflective on either side or both for catching and reflecting back light from oncoming headlights as the mirrors are rotated by the veins driven by traffic wind.

Other features may be added to the apparatus described above to enhance the operation of the device. For example, a magnet 40 may be embedded in the base to secure the indicator to any metalic portion of a distressed motor vehicle. Use of the magnet will allow the indicator to be placed even on curved surfaces and will prevent the apparatus from slipping off due to excess vibrations or high traffic wind.

Figure 2:
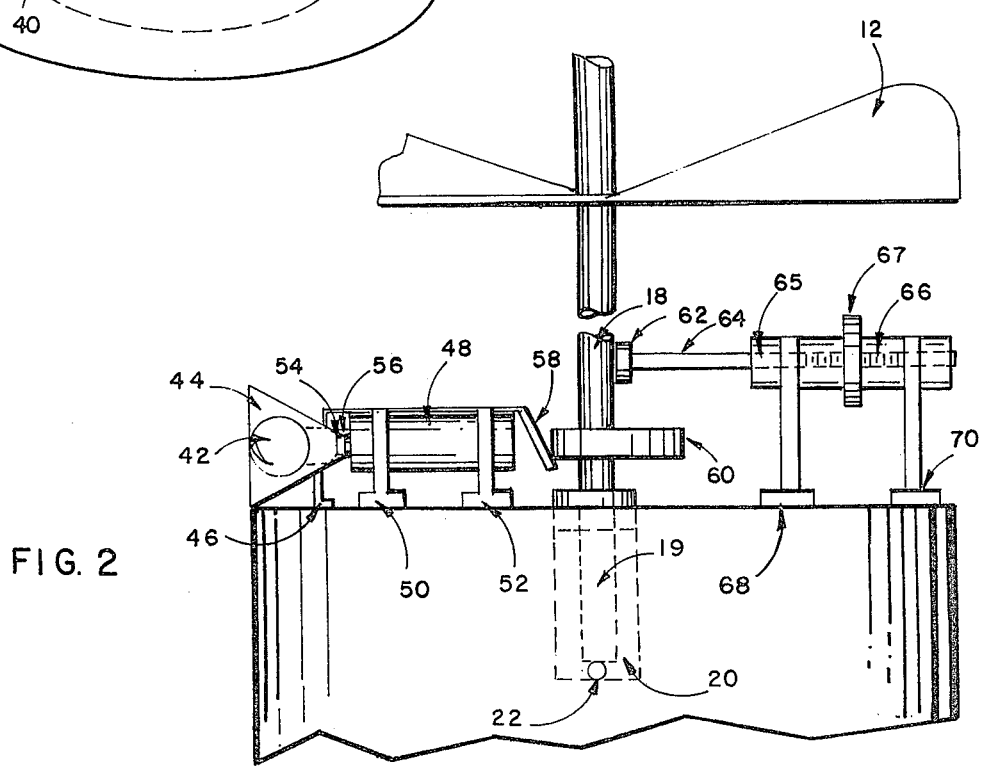
FIG. 2 is a side view of the device of FIG. 1.

Referring to FIG. 2, additional optional features are illustrated in a side view of FIG. 1. Bulb 42 is mounted in reflector-lens 44 secured to base 10 by bracket 46. Battery 48 is further mounted on base 10 by brackets 50 and 52. Bulb contact 54 and battery terminal 56 are in contact. Spring wire lead 58 secured by the mounting brackets is fastened to the second bulb contact and extends over the edge of battery 48. Circular cam 60 mounted on rotating shaft 18 biases the lead extension against the second battery terminal closing the circuit and flashing bulb 42 upon rotation of the shaft. The cam may of course, be designed to provide any desired on-off duty flashing cycle.

Occasionally it may be desirable to retard the rotation of shaft 18 when the traffic wind is too strong. For this purpose a pressure pad 62 engaging shaft 18 and mounted on rod 64 can be employed as a break. Rod 64 is shown slidably mounted in tubes 65 and 66 separated by adjusting knob 67 supported by brackets 68 and 70. Rod 64 is threaded in the vicinity of knob 67 such that rotating the knob increases or reduces the pressure of pad 62 on shaft 18.

It will be obvious that many modifications in the structure of the invention may be made without departing from the novel aspects of the device. For example, the bearing arrangement for the rotating shaft can be composed of a wide variety of mechanical devices used for such purposes. Additional sets of wind cups can be added to provide greater visibility and other optional indicating apparatus, audible indicators, for example, could be powered by the rotating shaft. Similarly, the arms supporting the mirrors and cups may be collapsible to facilitate storage. Accordingly, the invention is defined by the following claims.

What is claimed is:

1. A portable motor vehicle visual warning indicator comprising in combination:

a base;

a support bracket attached to said base;

a vertically oriented rotatable shaft, one end of which is mounted in said base; said shaft extending upwardly through said support bracket and terminating above said support bracket;

a plurality of pairs of wind driven cups mounted on and extending horizontally outward from said rotatable shaft and above said support bracket, such that when said cups are subjected to a relative wind, they will cause said rotatable shaft to rotate;

each pair of said wind driven cups mounted such that one of its members is mounted on the opposite side of said shaft from the other member;

mirror means mounted on and extending horizontally outward from said rotatable shaft such that said mirror means are caused to rotate when said wind driven cups are driven by a relative wind;

daylight reflective means connected with and driven by said wind cups;

a tab attached to each cup of at least one pair of said wind driven cups, the plane of said tabs being substantially tangential to the circumference of rotation of said cups;

daylight reflective means connected with said tabs;

said base constructed in part of a magnetic material for securing said apparatus to a metallic portion of a motor vehicle.

2. The apparatus of claim 1 wherein said daylight reflective means comprises a coating of daylight reflecting paint on said cups and said tabs.

3. The apparatus of claim 1 wherein said apparatus further includes:

a lamp mounted on said base;

a battery for supplying electrical power to said lamp mounted on said base;

switch means connecting said battery to said lamp;

switch activating means mounted on said rotatable shaft and actuated by the rotation of said shaft caused by said wind driven cups for periodically actuating said switch, thereby lighting said lamp.

4. The apparatus of claim 1 further including adjustable pressure means engaging said rotatable shaft for controlling the speed of rotation of said shaft and said cups.

5. The apparatus of claim 3 further including adjustable pressure means engaging said rotatable shaft for controlling the speed of rotation of said shaft and said cups.

* * * * *